April 7, 1970     C. JASIK ET AL     3,504,522
THERMOCOUPLE SYSTEM SIMULATOR
Filed Oct. 23, 1968     2 Sheets-Sheet 1
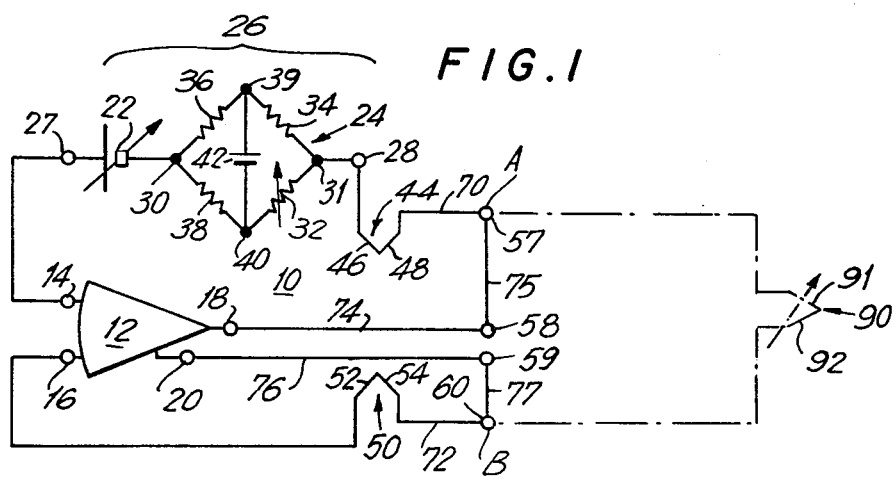
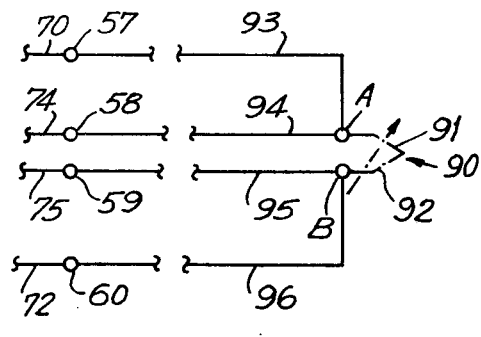
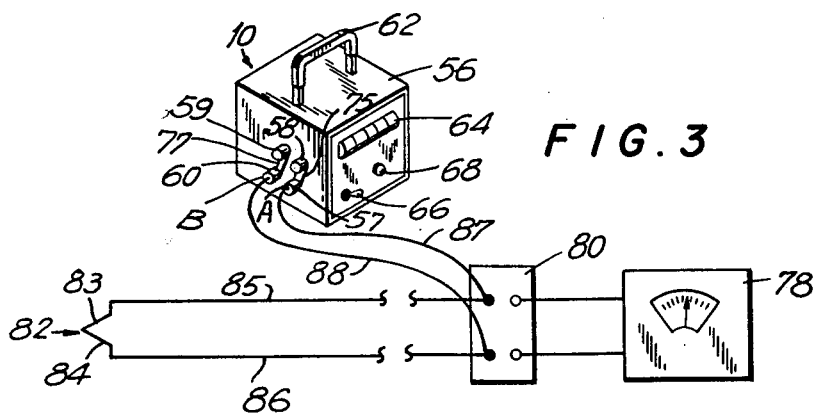
INVENTORS
CHARLES JASIK
IRVING SEIGER
LLOYD SILVERMAN
BY
ATTORNEYS April 7, 1970  C. JASIK ET AL  3,504,522

THERMOCOUPLE SYSTEM SIMULATOR

Filed Oct. 23, 1968  2 Sheets-Sheet 2

INVENTORS
CHARLES JASIK
IRVING SEIGER
LLOYD SILVERMAN

BY

ATTORNEYS

United States Patent Office 3,504,522
Patented Apr. 7, 1970

3,504,522
THERMOCOUPLE SYSTEM SIMULATOR
Charles Jasik, Great Neck, Lloyd Silverman, Bronx, and Irving M. Seiger, New York, N.Y., assignors to Chronetics, Inc., Mount Vernon, N.Y., a corporation of New York
Filed Oct. 23, 1968, Ser. No. 769,910
Int. Cl. G01k 15/00, 19/00
U.S. Cl. 73—1
10 Claims

ABSTRACT OF THE DISCLOSURE

A thermocouple system simulator adapted to simulate a thermocouple junction defined by first and second thermocouple metals disposed at a known temperature. The simulator has a virtual zero output impedance at its simulation terminals and includes an operational amplifier having a direct-current voltage source and bridge means disposed in the feedback loop thereof. One leg of said bridge means includes first resistance means variable in response to variations in temperature. Said resistance means is maintained at substantially the same temperature as the thermocouple junctions of the simulator.

BACKGROUND OF THE INVENTION

This invention relates generally to a thermocouple system simulator which simulates a thermocouple junction disposed at a reference temperature of the type utilized in thermocouple temperature measurement and control systems and for calibrating devices responsive to thermocouple EMF's. In the art, calibration of devices adapted to be responsive to thermocouple EMF's, such as meters and control systems, generally requires the use of a plurality of separate devices including a thermocouple maintained at a reference temperature, a stable power supply, a standard cell, and a D.C. potentiometer. One common method of maintaining said thermocouple at a known reference temperature is to emerse it in a melting ice bath. These known systems have been difficult to use while the relatively high source impedance thereof has proved a source of noise and error due to loading. The latter problem is not limited to the known thermocouple system calibrators, but rather, is present in all devices utilized to simulate thermocouples and having thermocouple metal terminals at which simulation is to occur. By providing a simulator having a virtual zero output impedance at its simulation terminals through the use of an operational amplifier, the problem of loading is avoided while a compact and highly flexible device is provided.

SUMMARY OF THE INVENTION

Generally speaking, in accordance with the invention, a thermocouple system simulator is provided which includes an operational amplifier having a summing point input, a signal ground input, an output and a power ground; a direct-current voltage source and bridge means connected in series to define a feedback circuit having first and second terminals, said feedback circuit first terminal being connected to said operational amplifier summing point; a first thermocouple junction defined by elements formed from a common metal and first thermocouple metal respectively and connected at its common metal element to said feedback circuit second terminal; and a second thermocouple junction defined by elements formed from said common metal and a second thermocouple metal respectively and connected at its common metal elements to said operational amplifier signal ground input.

The bridge means includes, in one leg thereof, first resistance means having a resistance variable in response to variations in temperature and maintained at substantially the same temperature as said first and second thermocouple junctions. The thermocouple system simulator has first and second simulation terminals at which simulation of a thermocouple junction defined by said first and second thermocouple metals disposed at a known temperature occurs. The first simulation terminal is connected to said first thermocouple metal element by means of a first thermocouple metal conductor, and the second simulation terminal is connected to said second thermocouple metal element by means of a second thermocouple metal conductor. The circuit is completed by connecting the operational amplifier output to a point intermediate the feedback circuit second terminal and the first simulation terminal, and connecting the operational amplifier power ground to a point of intermediate the operational amplifier signal ground input and the second simulation terminal. Said operational amplifier output is preferably connected to the first simulation terminal while said operational amplifier power ground is preferably connected to the second simulation terminal in order to minimize the output impedance at said simulation terminals.

In one embodiment of the simulator according to the invention, the operational amplifier and feedback circuit may be packaged as a single unit by providing connecting means having fixed and demountable portions interposed between the first and second thermocouple junctions and the operational amplifier and feedback circuit. The connecting means fixed and demountable portions are each provided with at least first and second terminals, and preferably are also provided with third and fourth terminals. The fixed portion terminals are adapted to engage the demountable portion terminals upon the connection of said fixed and demountable connecting means portions. The fixed portion first terminal is connected to the feedback circuit second terminal while the fixed portion second terminal is connected to the operational amplifier signal ground input. The first and second thermocouple junctions are disposed respectively in the demountable portion first and second terminals, the first resistance means and first and second connecting means terminals being maintained at substantially the same temperature, The operational amplifier output and power ground are connected, respectively, to the fixed portion third and fourth terminals if such terminals are provided. Said fixed portion forms a part of the above mentioned package and serves as an external connector therefore.

The bridge means, which has a pair of output terminals and a pair of internal terminals preferably includes, in a second leg thereof, at least one second resistance means having a selected resistance of a value relatively large when compared to the resistance of the first resistance means. The leg including said first resistance means and said second leg of the bridge means are both connected to one of said bridge means output termials. In this manner, the current flowing through the first resistance means is maintained substantially constant. In another embodiment of applicant's invention, the bridge means has a switch means and a plurality of second resistance means each having a selected resistance of a value relatively large when compared to the resistance of said first resistance means. The switch means is adapted to selectively connect one of said second resistance means in said second leg of said bridge means whereby the bridge means is adaptable, by selection of the appropriate second resistance means, for use with any one of a plurality of selected combinations of thermocouple metals. The foregoing embodiment may be further modified by providing a further switch means and a plurality rather than one third resistance means each having a resistance of a selected value for inclusion in a third leg of the bridge means. The second and third legs of the bridge means are both connected to one of the bridge means internal terminals. Said further switch means is adapted to selectively connect one of said third resistance means in said third leg, whereby said bridge means is further adapted, by selection of the appropriate second and third resistance means, for use with selected combinations of thermocouple metals.

When utilized in a temperature measurement or control system having a measurement or control device responsive to thermocouple EMF's and a measurement thermocouple defined by said first and second thermocouple metals, the simulator is provided with a resistor and an external terminal maintained at substantially the same temperature as the second simulation terminal. Said device, external terminal, and measurement thermocouple are connected in series, in the order recited, between the operational amplifier output and the first simulation terminal. The resistor is connected between the external terminal and the second simulation terminal. The resultant system provides amplificaiton of the thermocouple EMF to drive the device and a simulation of an accurate reference thermocouple.

Accordingly, it is an object of this invention to provide a thermocouple system simulator adapted to simulate a thermocouple junction defined by first and second thermocouple metal elements disposed at a known temperature.

Another object of the invention is to provide a thermocouple system simulator having a virtual zero output impedance at its simulation terminals.

A further object of the invention is to provide a thermocouple system simulator whose accuracy is not substantially affected by the use of extremely long thermocouple metal conductors to connect said simulator to a remotely disposed device.

Still another object of the invention is to provide a simulator which is compact and portable while having a high degree of accuracy.

Another object of the invention is to provide a simulator capable of simulating a thermocouple disposed at a range of temperatures.

Still another object of the invention is to provide a thermocouple simulator adapted to simulate a thermocouple junction defined by any one of a plurality of selected combinations of thermocouple metals by means of a simple adjustment and external connection of the appropriate thermocouple metal conductors.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic representation of one type of thermocouple system simulator constructed in accordance with the invention, the measurement thermocouple equivalent thereof being shown in phantom lines;

FIG. 2 is a partial schematic representation of the thermocouple system simulator of FIG. 1 connected for remote application, the measurement thermocouple equivalent thereof also being shown in phantom lines;

FIG. 3 is an in part perspective and in part schematic view of the thermocouple system simulator of FIG. 1 disposed to calibrate a meter responsive to the thermocouple EMF's;

DESCRIPTION OF THE PREFERRED EMBODIMENTS

Figure 4:
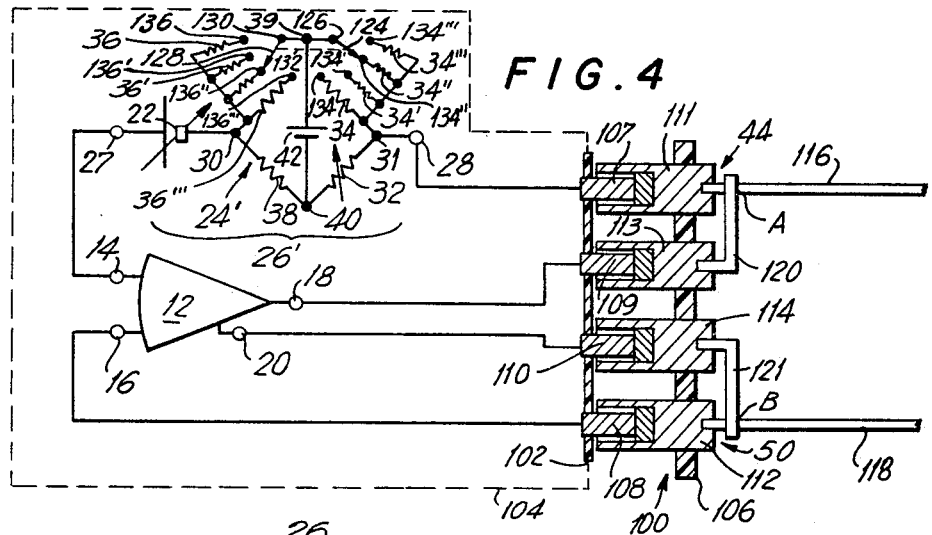
FIG. 4 is an in part sectional and in part schematic view of an alternate embodiment of the thermocouple system simulator according to the invention.

Referring now to FIG. 1, the thermocouple system simulator 10 schematically depicted incorporates an operational amplifier 12 of a type well known in the art. The operational amplifier 12 is connected as a voltage follower. The external terminals of operational amplifier 12 are the summing point input 14, the signal ground input 16, the output 18, and the power ground 20. In an ideal operational amplifier, positive voltage at the summing point input 14 produces a negative voltage at output 18. The power ground terminal 20 represents the ground connection of the power supply to the operational amplifier. Operational amplifier 12 is connected with a simple feedback loop wherein, assuming ideal characteristics, the operational amplifier has a closed-looped unity grain, an infinite input impedance and a zero output impedance. Said operational amplifier is preferably chopper stabilized in the conventional manner to improve the stability and performance thereof.

Disposed in the feedback loop of operational amplifier 12 are variable direct-current source 22 and bridge means 24 connected in series to define a feedback circuit 26 having first and second feedback terminals 27 and 28. As shown in the drawings, bridge means 24 is connected with its output terminals 30 and 31 connected respectively to the negative pole of direct-current source 22 and second feedback circuit terminal 28. This arrangement is given merely by way of example and not by way of limitation since the order of series connection of said direct-current source and bridge means is a matter of discretion, as is the polarity of direct-current source 22.

Bridge means 24 has in a first leg thereof first resistance means 32, in a second leg thereof second resistance means 34, in a third leg thereof third resistance means 36 and in a fourth leg thereof fourth resistance means 38. Connected between internal terminals 39 and 40 of said bridge means is a direct-current voltage source 42. The resistance of second resistance means 34 is preferably of a value relatively large when compared to the resistance of first resistance means 32 whereby the current flowing through said first resistance means is substantially constant. First resistance means 32 is of the type whose resistance varies with variations in temperature and is selected to have a temperature-resistance (and therefore voltage) curve which substantially corresponds in shape to the temperature-voltage curve of a thermocouple junction. The bridge means is substantially balanced and functions in the simulator according to the invention in a manner that will be described below.

A first thermocouple junction 44 defined by an element 46 formed from a common metal such as copper and an element 48 formed from a first thermocouple metal such as alumel, is disposed in series with feedback circuit 26, said common metal element 46 being connected to second feedback circuit terminal 28. A second thermocouple junction 50 defined by an element 52 formed from said common metal and an element 54 formed from a second thermocouple metal such as chromel is connected, at said common metal element 52, to the signal ground input 16 of operational amplifier 12. Means well known in the art is provided for maintaining first resistance means 32 and first and second thermocouple junctions 44 and 50 at substantially the same temperature.

As shown in FIG. 3, the operational amplifier 12, feedback circuit 26, and first and second thermocouple junctions 44 and 50 of thermocouple system simulator 10 may be packaged in a single housing 56 having four external terminals 57, 58, 59 and 60 which are shown schematically in FIGS. 1 and 2. Housing 56 may be provided with handle 62, thumbwheel dial and display 64 for varying direct-current voltage source 22 and displaying either the voltage thereof or the temperature being simulated as desired, on-off switch 66 and on-indicating light 68.

The thermocouple system simulator 10, according to the invention, is adapted to simulate, at simulation terminals A and B, a thermocoupler junction 90 shown in phantom lines in FIG. 1 defined by a first thermocouple metal element 91 and second thermocouple metal element 92 and disposed at a known temperature. First simulation terminal A is connected to the first thermocouple metal element 48 by means of a first thermocouple metal conductor 70 while second simulation terminal B is connected to said second thermocouple metal element 54 by means of second thermocouple metal conductor 72. The thermocouple system simulator according to the invention is completed by connecting operational amplifier output 18 to second feedback circuit terminal 28, first simulational terminal A or a point intermediate said terminals, and connecting operational amplifier power ground 20 to operational amplifier signal ground input 16, second simulation terminal B or a point intermediate said signal ground input and second simulation terminal. The precise point in the circuit selected for the latter interconnections determines the output impedance at simulation terminals A and B of thermocouple system simulator 10. This results from the fact that the output impedance of the operational amplifier circuit is substantially zero. The output impedance at simulation terminals A and B therefore substantially equals the impedance of the circuit elements between points A and B respectively and said points of interconnection, the balance of the circuit elements being within said operational amplifier circuit. Accordingly, the points of interconnection are preferably located at said simulation terminals in order to minimize the output impedance at said terminals.

Thus, in the embodiment shown in FIGS. 1 and 3, operational amplifier output 18 is connected by means of conductor 74, terminal 58 and conductor 75 to terminal 57 which defines first simulation terminal A. In like manner, power ground 20 is connected by means of conductor 76, terminal 59 and conductor 77 to terminal 60 which defines second simulation terminal B. In this manner, the output impedance at said simulation terminals is substantially zero. In this embodiment, first thermocouple metal conductor 70, second thermocouple metal conductor 72 and conductors 74 and 76 are all disposed within housing 56 while conductors 75 and 77 are in the form of external shunt conductors.

FIG. 3 shows the thermocouple system simulator 10 as it would be disposed for calibration of devices responsive to thermocouple EMF's. In the example shown, a meter 78 is connected through terminal block 80 to measurement thermocouple 82 and is responsive to the temperature detected by said thermocouple. Measurement thermocouple 82 is defined by an element 83 formed from said first thermocouple metal and an element 84 formed from said second thermocouple metal and is connected to said junction box by means of conductors 85 and 86 formed from like materials. The thermocouple system simulator 10 is connected into the circuit at junction box 80 by means of conductor 87 formed from said first thermocouple metal and extending from terminal 57 (first simulation terminal A) and conductor 88 formed from said second thermocouple metal and extending from terminal 60 (second simulation terminal B.)

Since, at said first and second simulation terminals, the thermocouple system simulator 10 has an output impedance of substantially zero, it is unnecessary to disconnect the measurement thermocouple 82 from the circuit. Said measurement thermocouple is substantially short circuited by the thermocouple system simulator. This ability to be connected into a circuit without disturbing the existing circuit arrangement is a particularly important advantage of said simulator due to the resultant savings in time and costs of calibration. For example, certain temperature sensitive meters on aircraft, such as the exhaust gas temperature indicator must be calibrated frequently due to the critical nature of the temperature being measured. In the case of the exhaust gas temperature indicator, the measurement thermocouple is disposed in the engine of the aircraft to monitor the turbine temperature, which must be maintained within a relatively narrow range to maintain the efficiency of the engine while avoiding damage to the turbine blades. The use of the thermocouple system simulator according to the invention substantially reduces the time required for calibrating the plurality of pertinent meters in an aircraft, and therefore increases the period of time said aircraft is available for use.

The embodiment of the thermocouple system simulator shown in FIGS. 1 and 3 is connected as it would be if disposed substantially adjacent to the device sensitive to thermocouple EMF's which is to be calibrated. Accordingly, thermocouple metal conductors 87 and 88 are relatively short so that the accuracy of the simulator is not affected by the voltage drops therealong caused by the current flowing therethrough. However, if said device were disposed in a location remote from housing 56, thermocouple conductors 87 and 88 would be extremely long and the resistance thereof, being substantial and outside the operational amplifier circuit, would introduce errors in calibration. In effect, the desired point of simulation, and therefore simulation terminals A and B would be located at said remote location. Accordingly, pursuant to the principles outlined above, the operational amplifier output 18 should be connected directly to the remotely located first simulation terminal A while the operational amplifier power ground 20 should be connected directly to the remotely located second simulation terminal B in order to minimize this error by minimizing the output impedance at said simulation terminals.

As shown in FIG. 2, this result is achieved by removing shunt conductors 75 and 77 and connecting terminal 57 to first simulation terminal A by means of a conductor formed from said first thermocouple metal, connecting terminals 58 and 59 respectively by means of conductors 94 and 95 to first and second simulation terminals A and B and connection terminal 60 to said second simulation terminal by means of a conductor 96 formed from said second thermocouple metal. In this manner, thermocouple metal conductors 93 and 96 are included in the operational amplifier circuit while the output impedance of the thermocouple system simulator according to the invention is maintained at substantially zero. As in the embodiment of FIG. 1, a thermocouple 90 defined by first and second thermocouple metal elements 91 and 92 is simulated at said simulation terminal.

The thermocouple system simulator 10 operates on the principle of cold junction compensation. If the EMF generated by a thermocouple defined by elements formed by said first and second thermocouple metals and disposed at a standard reference temperature of, for example, +32 degrees fahrenheit, is $E_o$ then the EMF generated by first thermocouple junction 44 and second thermocouple junction 50 at a particular ambient temperature is represented by $E_O$ plus $E_T$. $E_T$ varies with temperature and it is this variation which must be compensated for to achieve controlled and accurate simulation. Compensation is achieved by bridge means 24 the components of which are selected so that a compensating voltage $E_C$ is produced at output terminals 30 and 31 equal to $E_T$ throughout the ambient temperature range but of opposite polarity. The temperature responsiveness of bridge means 24 is due to first resistance means 32 which is chosen so that the resistance thereof varies with temperature along a curve which substantially corresponds to the temperature-voltage curve of a thermocouple junction. Current flowing through first resistance means 32 is preferably maintained substantially constant due to the relatively large resistance value of second resistance means 34 when compared with that of first resistance means 32. Variations in output voltage $E_C$ of said bridge means therefore substantially follows the variations in resistance of said first resistance means. The second, third and fourth resistance means 34, 36 and 38 are selected so that the temperature-voltage curve of $E_C$ substantially corresponds to the temperature-voltage curve of the $E_T$ of a thermocouple junction formed from a selected combination of thermocouple metals over the ambient temperature range. Since first resistance means 32 and first and second thermocouple junctions 44 and 50 are maintained at substantially the same temperature, the output of this compensation arrangement is $E_O$, the EMF generated at the chosen reference temperature.

By the foregoing arrangement, a device is produced which simulates a thermocouple junction defined by elements formed from said first and second thermocouple metals disposed at a reference temperature such as +32 degrees fahrenheit. By setting variable direct-current voltage source 22 at a voltage equal to the $E_T$ of the temperature to be simulated, the output of the simulator equals $E_O$ plus $E_T$, or the EMF of a measurement thermocouple disposed at the desired temperature. Any desired temperature can be simulated by setting direct-current voltage source 22 to the appropriate voltage which can be positive or negative. The means for varying direct-current voltage source 22 and the display dial associated therewith are prefably profiled to conform to a standard thermocouple EMF curve so that the dial directly displays the temperature simulated, any errors due to variations in ambient temperature being compensated for by bridge means 24.

Referring now to FIG. 4, still another embodiment of the thermocouple system simulator according to the invention is shown. This embodiment is specifically adapted for use with any of a plurality of selected combinations of thermocouple metals. This increased flexibility is achieved by providing a connecting means 100 interposed between first and second thermocouple junctions 44 and 50, and operational amplifier 12 and modified feedback circuit 26'. Connecting means 100 includes a fixed portion 102 secured to the housing 104 shown schematically in dotted lines and preferably adapted to house said operational amplifier and modified feedback circuit, and a demountable portion 106. The connecting means fixed and demountable portions are each provided with four terminals, the fixed portion terminals 107, 108, 109 and 110 being adapted to engage the demountable portion terminals 111, 112, 113 and 114 upon the connection of said fixed and demountable portions.

The first terminal 107 of fixed portion 102 is connected to second feedback terminal 28, the second terminal 108 is connected to operational amplifier signal ground input 16, the third terminal 109 is connected to the operational amplifier output 18 and the third terminal 110 is connected to the operational amplifier power ground 20. A first thermocouple metal conductor is connected to the first terminal 111 of demountable portion 106, and defines at that connection first thermocouple junction 44. Demountable portion first terminal 111 is formed from said common metal and defines the common metal element of said first thermocouple junction, first thermocouple metal conductor 116 defining the first thermocouple metal element thereof. A second thermocouple metal conductor 118 is connected to demountable portion second terminal 112 to define second thermocouple junction 50. Second terminal 112 is also formed from a common metal and defines the common metal element of said second thermocouple junction, the second thermocouple metal junction being defined by second thermocouple conductor 118.

For the reasons enumerated in the discussion of the embodiment of FIG. 1, operational amplifier output 18 may be connected to any point intermediate second feedback terminal 28 and first simulation terminal A depending on the amount of impedance between the point of connection and simulation terminal A. For like reason, operational amplifier power ground 20 may be connected to any point between operational amplifier signal ground input 16 and simulation terminal B. In the specific example shown in FIG. 4, the foregoing connections are made by means of conductor 120 extending between the third terminal 113 of fixed portion 106 and first thermocouple metal conductor 116, and conductor 121 extending between fixed portion fourth terminal 114 and second thermocouple metal conductor 118. This arrangement is preferable since the contact resistance between the fixed and demountable portions is thereby included within the feedback loop of the operational amplifier rather than in the output impedance of the thermocouple system simulator. However, such contact resistance can be minimized and said connections can be made within housing 104, in which case the third terminal 109, 113 and fourth terminal 110, 114 can be dispensed with. Further, the example of FIG. 4 presumes that the length of first and second thermocouple metal conductors 116 to 118 is limited as would be the case in a connection such as is shown in FIG. 3. If the length of said thermocouple metal conductors is sufficient to result in a substantial impedance, as would be the case if the device to be simulated were located at a remote location, then simulation terminals A and B would be deemed to be located at said remote location and conductors 120 and 121 would preferably be connected to said remotely located simulation terminals. The latter arrangement would correspond to the arrangement shown in FIG. 2.

The embodiment shown in FIG. 4 is specifically adapted to simulate a thermocouple junction defined by any one of a plurality of selected combinations of thermocouple metals. To this end, housing 104 need not contain any thermocouple metal junctions or conductors, the only thermocouple metal required being connected to the fixed portion of connecting means 100. Of course, first resistance means 32 and first and second thermocouple junctions 44 and 50 must be maintained at substantially the same temperature in order for the simulator to operate properly. This is achieved by disposing said second resistance means adjacent the first terminal 107, 111 and second terminal 108, 112 of connecting means 100 and maintaining said first resistance means and said connecting means termials at substantially the same temperature by means well known in the art.

In order to provide the desired flexibility, bridge means 24' is modified by providing a plurality of second resistance means 34, 34', 34'' and 34''' and a plurality of third resistance means 36, 36', 36'' and 36'''. One end of each of said second resistance means are connected together and to bridge means output terminal 32. A first switch means is provided in the second leg of said bridge means consisting of contact arm 124 pivotable about contact 126 and displaceable into engagement with any one of the fixed contacts 134, 134', 134'' and 134''' connected respectively to the other end of second resistance means 34, 34', 34'' and 34'''. In like manner a second switch means is provided in the third leg consisting of contact arm 128 pivotable about contact 130 and displaceable into engagement with any one of fixed contacts 136, 136', 136'' and 136''', which are in turn connected respectively to one end of third resistance means 36, 36', 36'' and 36'''. The other end of said third resistance means are connected together and to the other of said bridge means output terminals 30. The two switch means are preferably ganged together as shown schematically by dashed line 123. Said switch means are adapted to selectively connect one of said second resistance means such as second resistance means 34'' and one of said third resistance means such as third resistance means 36'' into said second and third legs respectively of bridge means 24'.

The connection of a second resistance means of a different resistance value in the second leg of bridge means 24′ changes the current through first resistance means 32, and therefore the slope of the thermocouple temperature-voltage curve of the thermocouple being simulated. The connection of a third resistance means of a different resistance value in the third leg adjusts the balance of the bridge and therefore the reference temperature against which $E_T$ is measured or, in other words, the point at which the temperature-voltage curve crosses the temperature axis. Each of said second and third resistance means functions in the manner described above in connection with bridge means 24 of FIG. 1. However, the values of the resistance of each associated pair of second and third resistance means, for example, second resistance means 34″ and third resistance means 36″, are selected so that the output of the bridge means substantially conforms to the temperature-voltage curve of the $E_T$ of the particular combination of thermocouple metals from which conductors 116 and 118 are formed, over the ambient temperature range. Bridge means 24′, by displacing the two switch means, is thus tailorable for use with a plurality of combinations of thermocouple metals, thereby substantially increasing the versatility of the thermocouple system calibrator according to the invention. In the particular example shown in FIG. 4, the thermocouple system simulator is adapted for use with four different combinations of thermocouple metals.

In the embodiment shown in FIG. 4, both said second and third resistance means are shown to be variable. If a lesser degree of accuracy can be tolerated, third resistance means 36′, 36″ and 36‴ and second switch means 128, 130 can be dispensed with, third resistance means 36 being permanently connected in the third leg of bridge means 24′.

Figure 5:
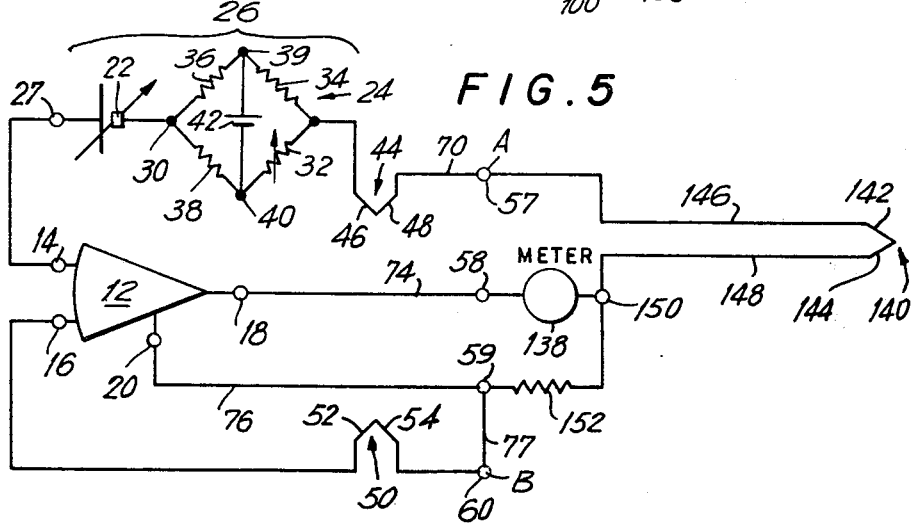
FIG. 5 is a schematic representation of the thermocouple system simulator of FIG. 1 disposed in a temperature measurement or control arrangement.

Referring now to FIG. 5, the thermocouple system simulator 10 according to the invention is shown disposed in a temperature meausrement or control system. The portion of the circuit to the left of terminals 57, 58, 59 and 60 is identical with the embodiment of the thermocouple system simulator shown in FIG. 1 except that shunt conductor 75 between terminal 57 and 58 has been removed, and accordingly, this portion of the circuit will not be described again. A typical temperature measurement or control system generally includes a device responsive to thermocouple EMF's such as meter 138, a measurement thermocouple such as measurement thermocouple 140 defined by first thermocouple metal element 142 and second therocouple element 144, and a reference thermocouple. The thermocouple system simulator 10 simulates an extremely accurate reference thermocouple without requiring ovens or melting ice baths while amplifying the signal applied to the device responsive to thermocouple EMF's. The temperature measurement or control system according to the invention also includes external terminal 150 and resistor 152 and is formed by connecting first simulation terminal A (terminal 57) to the first thermocouple metal element 142 of measurement thermocouple 140 by means of first thermocouple metal conductor 146, connecting the second thermocouple metal element 144 to an external terminal 150 by means of a length of a second thermocouple metal conductor 148, and connecting meter 138 between said external terminal 150 and terminal 58 which in turn is connected to operational amplifier output 18. The circuit is completed by connecting resistor 152 between external terminal 150 and second simulation terminal B (terminal 60), the latter connection being through terminal 59 and conductor 77. In order to avoid the introduction of additional thermocouple EMF's into the system, external terminal 150 and second simulation terminal B, both of which have a junction between a second thermocouple metal conductor and a conductor formed from a common metal such as copper, are maintained at substantially the same temperature.

The meter 138 detects the sum of the thermocouple EMF generated by the measurement thermocouple 140 and the simulated thermocouple EMF of the reference thermocouple as simulated at first and second simulation terminals A and B. The precise voltage read at the meter equals the algebraic sum of these two voltages times an amplification factor. This amplification factor is equal to the value of the resistance of said meter divided by the value of the resistance of resistor 152. The thermocouple system calibrator according to the invention thereby enables a conventional measurement thermocouple to drive a meter or control device.

Figure 6:
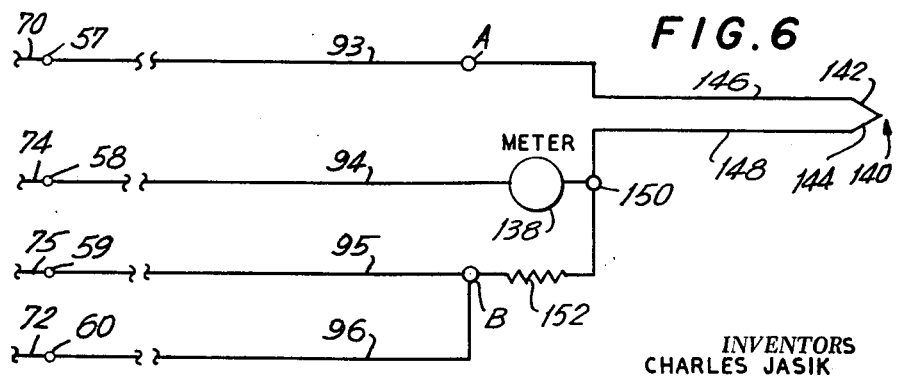
FIG. 6 is a partial schematic representation of the thermocouple system simulator of FIG. 2 disposed in a temperature measurement or control arrangement wherein portions are disposed at a remote location.

FIG. 6 shows the thermoscouple system simulator according to the invention connected in a temperature measurement or control system disposed in a location remote from the housing containing the operational amplifier and feedback circuit. This embodiment substantially corresponds to the embodiment shown in FIG. 2 except that conductor 94 is disconnected from first simulation terminal A and is connected to the meter 138. This arrangement functions in the manner described above. The embodiment of the invention shown in FIG. 4 can readily be connected in a temperature measurement or control system as shown in FIGS. 5 and 6 by applying the principals enumerated above.

As used herein, the term "conductor," unless otherwise identified as being a thermocouple metal conductor, refers to a conductor formed from the common metal of which elements 46 and 52 of first and second thermocouple junctions 44 and 50 are formed, or a metal having substantially no thermocouple EMF when connected to said common metal. Further, wherever it is recited herein that an element of a thermocouple junction is connected to a terminal by a conductor of like material, said terminal may be defined by said thermocouple junction element and such arrangement would be deemed the full equivalent of connecting said terminal to said element by means of a separate thermocouple metal conductor.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A thermocouple system simulator adapted, when connected to a first thermocouple junction defined by elements formed from a common metal and a first thermocouple metal and a second thermocouple junction defined by elements formed from said common metal and a second thermocouple metal, to simulate a thermocouple junction defined by said first and second thermocouple metals disposed at a known temperature, which comprises an operational amplifier having a summing point input, a signal ground input, an output and a power ground; a direct-current voltage source; bridge means having first resistance means in one leg thereof, the resistance of said first resistance means being variable in response to variations in temperature; said bridge means and direct-current voltage source being connected in series to define a feedback circuit having first and second terminals, said feedback circuit first terminal being connected to said operational amplifier summing point input; connecting means having first, second, third and fourth terminals connected respectively to said feedback circuit second terminal, said operational amplifier signal ground input, said operational amplifier output, and said operational amplifier power ground; and means for maintaining said first resistance means and said first and second thermocouple junctions at substantially the same temperature, said connecting means first terminal being adapted to be connected to said first thermocouple junction common metal element, said connecting means second terminal being adapted to be connected to said second thermocouple junction common metal element.

2. A thermocouple system simulator comprising at least first and second simulation terminals; and operational amplifier having a summing point input, a signal ground input, an output and a power ground; a direct-current voltage source; bridge means having first resistance means in one leg thereof, the resistance of said first resistance means being variable in response to variations in temperature; and said bridge means and direct-current voltage source being connected in series to define a feedback circuit having first and second terminals, said feedback circuit first terminal being connected to said operational amplifier summing point input; a first thermocouple junction defined by elements formed from a common metal and a first thermocouple metal respectively, said first thermocouple junction being connected at its common metal element to said feedback circuit second terminal; a first thermocouple metal conductor coupling said first simulation terminal and said first thermocouple metal element; a second thermocouple junction defined by elements formed from said common metal and a second thermocouple metal respectively, said second thermocouple junction being connected at its common metal element to said signal ground input; and a second thermocouple metal conductor coupling said second simulation terminal and said second thermocouple metal element, said first resistance means and said first and second thermocouple junctions being maintained at substantially the same temperature, said operational amplifier output being connected to a point at or intermediate said feedback circuit second terminal and said first simulation terminal, said operational amplifier power ground being connected to a point at or intermediate said operational amplifier signal ground input and said second simulation terminal, whereby a thermocouple junction defined by said first and second thermocouple metals disposed at a known temperature is simulated at said simulation terminal.

3. A thermocouple system simulator as recited in claim 2, wherein said operational amplifier output is connected to said first simulation terminal and said operational amplifier power ground is connected to said second simulation terminal, whereby the output impedance at said simulation terminals is minimized.

4. A thermocouple system simulator as recited in claim 2, including a connecting means having fixed and demountable portions interposed between said first and second thermocouple junctions and said operational amplifier and feedback circuit, said connecting means fixed and demountable portions each having at least first and second terminals, said fixed portion terminals being adapted to engage said demountable portion terminals upon the connection of said fixed and demountable connecting means portions, said fixed portion first terminal being connected to said feedback circuit second terminal, said fixed portion second terminal being connected to said operational amplifier signal ground input, said first and second thermocouple junctions being disposed respectively in said demountable portion first and second terminals, said first resistance means and said first and second connecting means terminals being maintained at substantially the same temperature, whereby said operational amplifiers, feedback circuit and connecting means fixed portion may be packaged as a single unit.

5. A thermocouple system simulator as recited in claim 4, wherein each of said fixed and demountable portions said connecting means includes third and fourth corresponding terminals, said fixed portion third and fourth terminals being adapted to engage the corresponding demountable portion terminals upon the connection of said fixed and demountable connecting means portions, said operational amplifier output and power ground being connected respectively to said fixed portion third and fourth terminals said connecting means third and fourth terminals respectively being connected to said connecting means first and second terminals.

6. A thermocouple system simulator as recited in claim 3, including an external terminal maintained at substantially the same temperature as said second simulation terminal; a device responsive to thermocouple EMF's; a measuring thermocouple junction defined by elements formed from said first and second thermocouple metals; a further first thermocouple metal conductor; a further second thermocouple metal conductor; and a resistor, said device, external terminal, measurement thermocouple and further first and second thermocouple metal conductors being interposed in series between said operational amplifier output and said first simulation terminal with said device being disposed between said operational amplifier output and said external terminal, said further second thermocouple metal conductor being disposed between said external terminal and said measuring thermocouple second thermocouple metal element, and said further second thermocouple metal conductor extending between said measurement thermocouple first thermocouple metal element and said first simulation terminal, said resistor being connected between said external terminal and said second simulation terminal, whereby said device is responsive to the combination of the simulated thermocouple EMF at said first and second simulation terminals, which serves as a reference, and the thermocouple EMF of said measurement thermocouple.

7. A thermocouple system simulator as recited in any one of claims 1, 2, 3, 4, 5 and 6 wherein said bridge means has a pair of output terminals and a pair of internal terminals, said bridge means including, in a second leg thereof, at least one second resistance means having a selected resistance of a value relatively large when compared to the resistance of said first resistance means, said first-mentioned leg and said second leg of said bridge means both being connected to one of said bridge means output terminals, whereby the current flowing through said first resistance means is substantially constant.

8. A thermocouple system simulator as recited in any one of claims 1, 2, 3, 4, 5 and 6 wherein said bridge means has a pair of output terminals and a pair of internal terminals, said bridge means including a plurality of second resistance means each having selected resistance of a value relatively large when compared to the resistance of said first resistance means, and a switch means, said switch means being adapted to selectively connect one of said second resistance means in a second leg of said bridge means, said first mentioned leg and said second leg of said bridge means both being connected to one of said bridge means output terminals, whereby the current flowing through said first resistance means is substanitally constant and said bridge means is adaptable, by selection of the appropriate second resistance means, for use with one of a plurality of selected combinations of thermocouple metals.

9. A thermocouple system simulator as recited in any one of claims 1, 2, 3, 4, 5 and 6 wherein said bridge means has a pair of output terminals and a pair of internal terminals, said bridge means including, a plurality of second resistance means each having a selected resistance of a value relatively large when compared to the resistance of said first resistance means, a plurality of third resistance means each having a resistance of a selected value, and a switch means, said switch means being adapted to selectively connect one of said second resistance means in a second leg of said bridge means and one of said third resistance means in a third leg of said bridge means, said first-mentioned leg and said second leg of said bridge means both being connected to one of said bridge means output terminals said second and third legs of said bridge means both being connected to one of said bridge means internal terminals, whereby the current flowing through said first resistance means is substantially constant and said bridge means is adapted, by selection of the appropriate second and third resistance means, for use with selected combinations of thermocouple metals.

10. A thermocouple system simulator as recited in any one of claims 1, 2, 3, 4, 5 and 6 wherein said direct current voltage source is variable whereby said simulator is adapted to simulate a measurement thermocouple junction defined by said first and second thermocouple metals over a temperature range.

References Cited

UNITED STATES PATENTS

| 2,876,417 | 3/1959 | Winram. | |
| 2,886,776 | 5/1959 | Knudson | 73—1 |
| 3,142,798 | 6/1964 | Schwartz | 324—74 |

S. CLEMENT SWISHER, Primary Examiner

U.S. Cl. X.R.

324—74